(12) United States Patent
Jubinville

(10) Patent No.: US 9,538,737 B2
(45) Date of Patent: Jan. 10, 2017

(54) FISHING HOOK AND LURE PROTECTOR

(71) Applicant: Delton Jubinville, Athabasca (CA)

(72) Inventor: Delton Jubinville, Athabasca (CA)

(*) Notice: Subject to any disclaimer, the term of this patent is extended or adjusted under 35 U.S.C. 154(b) by 0 days.

(21) Appl. No.: 14/443,304

(22) PCT Filed: Oct. 25, 2013

(86) PCT No.: PCT/CA2013/050809
§ 371 (c)(1),
(2) Date: May 15, 2015

(87) PCT Pub. No.: WO2014/075179
PCT Pub. Date: May 22, 2014

(65) Prior Publication Data
US 2015/0282468 A1    Oct. 8, 2015

(30) Foreign Application Priority Data

Nov. 15, 2012 (CA) .................. 2796106

(51) Int. Cl.
A01K 97/06 (2006.01)
A01K 99/00 (2006.01)

(52) U.S. Cl.
CPC ........... *A01K 97/06* (2013.01); *A01K 99/00* (2013.01)

(58) Field of Classification Search
CPC ................ A01K 97/08; A01K 97/06
USPC .............. 43/25.2, 53.5; D22/134, 126
See application file for complete search history.

(56) References Cited

U.S. PATENT DOCUMENTS

| 2,671,979 | A | * | 3/1954 | Jones, Jr. | ............ A01K 97/18 269/294 |
| 2,767,502 | A | | 10/1956 | Reynolds | |
| 2,849,825 | A | | 9/1958 | Reisner | |
| 3,389,491 | A | * | 6/1968 | Lowrey | ............ A01K 97/14 43/5 |
| 3,722,128 | A | | 3/1973 | Tremblay | |
| 3,905,145 | A | * | 9/1975 | Cunningham | ......... A01K 97/18 43/53.5 |
| 4,015,361 | A | | 4/1977 | O'Reilly et al. | |
| 4,441,274 | A | | 4/1984 | Masur | |
| 5,056,256 | A | | 10/1991 | Truax | |
| 5,123,199 | A | | 6/1992 | Lysohir et al. | |
| 5,452,538 | A | | 9/1995 | Trefiak | |
| 5,588,245 | A | * | 12/1996 | Vance | ............ A01K 97/06 43/25.2 |
| D399,912 | S | | 10/1998 | Kopp, III | |
| 5,992,082 | A | | 11/1999 | Barefoot | |

(Continued)

*Primary Examiner* — Cassandra Davis
(74) *Attorney, Agent, or Firm* — Christensen O'Connor Johnson Kindness PLLC

(57) ABSTRACT

A fishing hook and lure protector includes a hollow body that defines an enclosure. The body has a resilient sidewall with a first circumferential peripheral edge, a second circumferential peripheral edge and a slit that extends for the height of the resilient sidewall from the first circumferential peripheral edge to the second circumferential peripheral edge and defines a first engagement edge and a second engagement edge. A first engagement profile is positioned along the first engagement edge. A second engagement profile is positioned along the second engagement edge. The first engagement profile and the second engagement profile cooperate to attached the body to one of the line guides of the fishing rod.

4 Claims, 4 Drawing Sheets

(56) References Cited

U.S. PATENT DOCUMENTS

| | | | |
|---|---|---|---|
| 6,085,455 A * | 7/2000 | Bracken | A01K 97/06 206/315.11 |
| 6,574,906 B1 | 6/2003 | Meier et al. | |
| 7,587,855 B2 | 9/2009 | Konopa | |
| 7,703,234 B2 | 4/2010 | Dodge | |
| 7,926,221 B2 | 4/2011 | Meier et al. | |
| 8,650,796 B1 * | 2/2014 | Bates | A01K 97/08 206/315.11 |
| 2005/0091906 A1 | 5/2005 | D'Alusio | |
| 2014/0125075 A1 * | 5/2014 | Xiques | A01K 97/08 294/143 |

* cited by examiner

FISHING HOOK AND LURE PROTECTOR

FIELD

There is described a simple device which will encapsulate a fishing hook or fishing lure to prevent injuries or entanglements.

BACKGROUND

U.S. Pat. No. 3,722,128 (Tremblay) entitled "Snag Shield and Scent Carrier for Lure Hooks" discloses a flexible shield that is engaged over a shank of a fish hook to shield the barbs of the fish hook from snags. U.S. Pat. No. 5,452,538 (Trefiak) entitled "Fish Hook Protector" discloses a body with a cylindrical sidewall that encases a fishing hook to prevent accidental engagement with the fishing hook. U.S. Pat. No. 5,056,256 (Truax) entitled "Rod-mountable Fishing Tackle Holder" discloses a body that has a hollow cylindrical passage for holding a fishing lure. The body also has resilient clips for attaching to a shaft of a fishing rod. There will now be described an alternative configuration of fishing hook and lure protector.

SUMMARY

There is provided a fishing hook and lure protector which includes a hollow body that defines an enclosure. The body has a resilient sidewall with a first circumferential peripheral edge, a second circumferential peripheral edge and a slit that extends for the height of the resilient sidewall from the first circumferential peripheral edge to the second circumferential peripheral edge and defines a first engagement edge and a second engagement edge. A first engagement profile is positioned along the first engagement edge. The first engagement profile includes a recess configured to receive a ring shaped line guide of a fishing rod and a first engagement profile configured to engage a first inside edge of the line guide of the fishing rod. A second engagement profile is positioned along the second engagement edge. The second engagement profile includes a recess configured to receive a ring shaped line guide of a fishing rod and a second engagement member configured to engage a second inside edge of the same line guide of the fishing rod engaged by the first engagement profile. Overlapping of the first engagement edge and the second engagement edge closes the slit of the enclosure and maintains the first engagement profile and the second engagement profile biased by the resilient sidewall into engagement with the line guide of the fishing rod.

The fishing hook and lure protector described above uses the resilient sidewall to close the slit and bias the engagement profiles into engagement with the line guide of the fishing rod.

It is preferred that the first circumferential peripheral edge has a circumference that defines a first access opening to the enclosure that is too small for a hook or lure to pass through and the second circumferential peripheral edge has a circumference the defines a second access opening that is large enough for the hook or lure to enter and exit the enclosure. In the embodiment that will hereinafter be described the body is best described as having the shape of a funnel.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
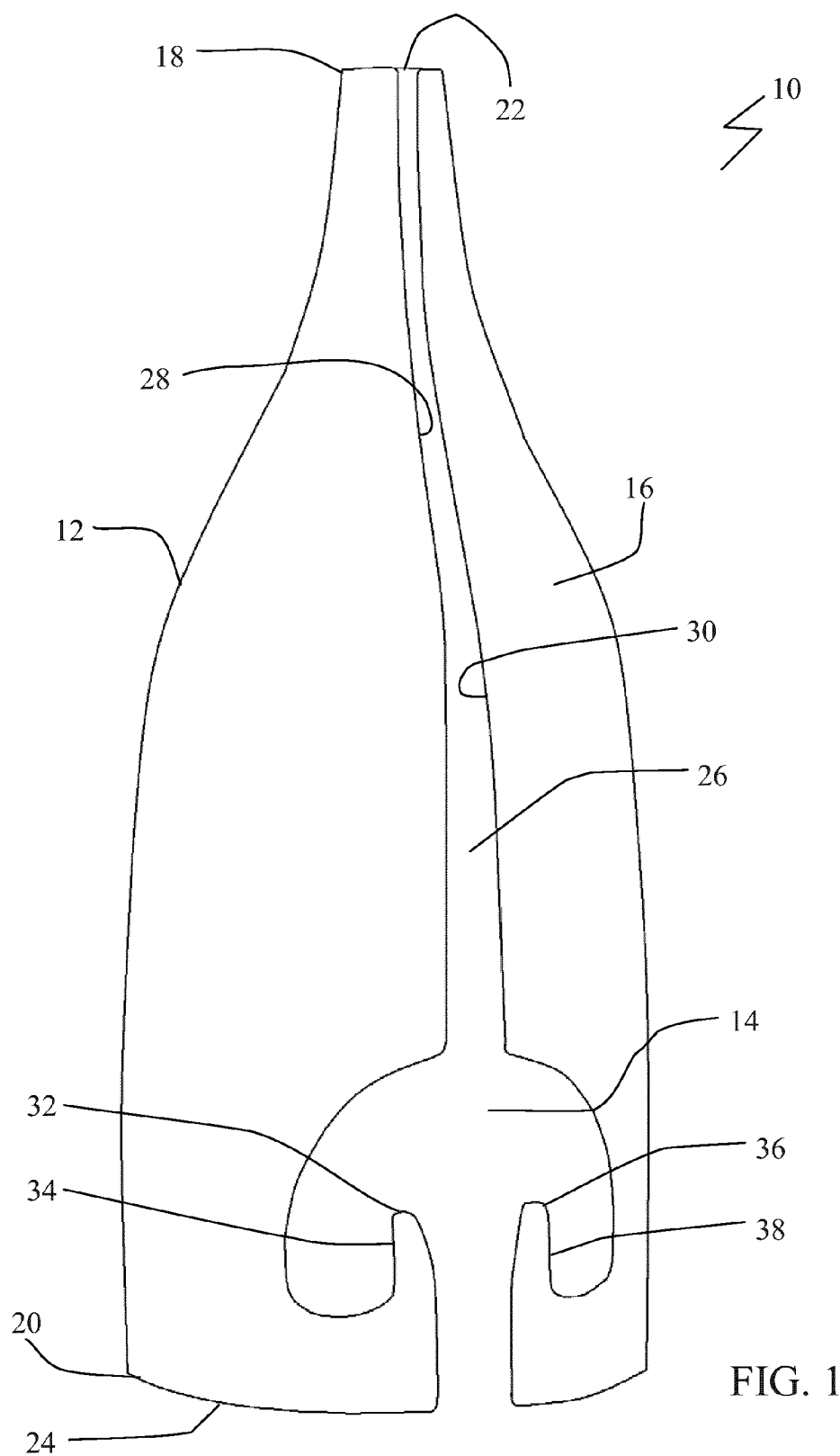
FIG. 1 is a front elevation view of a fishing hook and lure protector.

A fishing hook and lure protector generally identified by reference numeral 10, will now be described with reference to FIG. 1 through 6.

Structure and Relationship of Parts:

Referring to FIG. 1, a fishing hook and lure protector 10 has a hollow body 12 that defines an enclosure 14. In the embodiments shown, body 12 is in the shape of a funnel, however it will be understood that different shaped bodies, such as cylindrical or conical may be used. Body 12 has a resilient sidewall 16 with a first circumferential peripheral edge 18 and a second circumferential peripheral edge 20. First circumferential peripheral edge 18 and second circumferential peripheral edge 20 may be rounded to prevent snagging on a fishing line and provide better guidance for a fishing line. First circumferential peripheral edge 18 has a circumference that defines a first access opening 22 to enclosure 14 that is too small for a hook or lure to pass through. Second circumferential peripheral edge 20 has a circumference that defines a second access opening 24 that is large enough for the hook or lure to enter and exit enclosure 14. A slit 26 extends for the height of the resilient sidewall 16 from first circumferential peripheral edge 18 to second circumferential peripheral edge 20 and defines a first engagement edge 28 and a second engagement edge 30.

Figure 3:
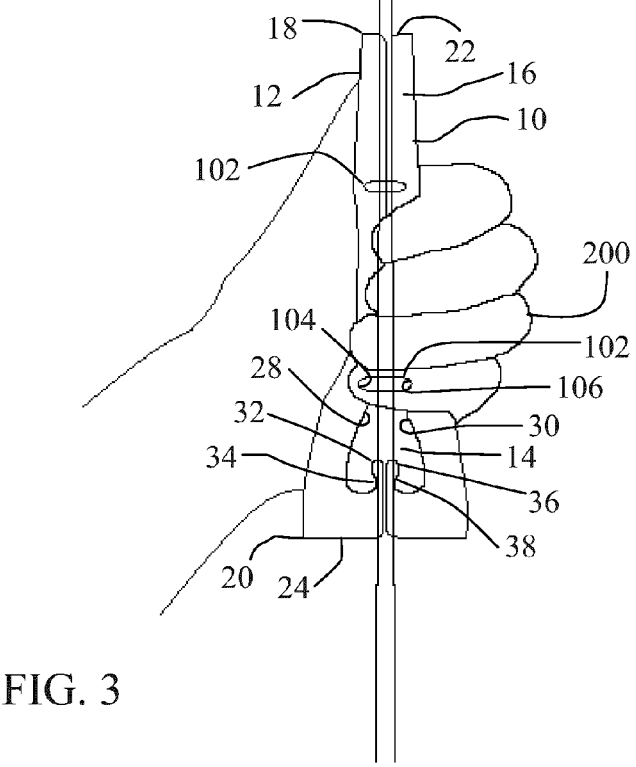
FIG. 3 is a front elevation view of the second step of attaching the fishing hook and lure protector to a fishing rod.
Figure 4:
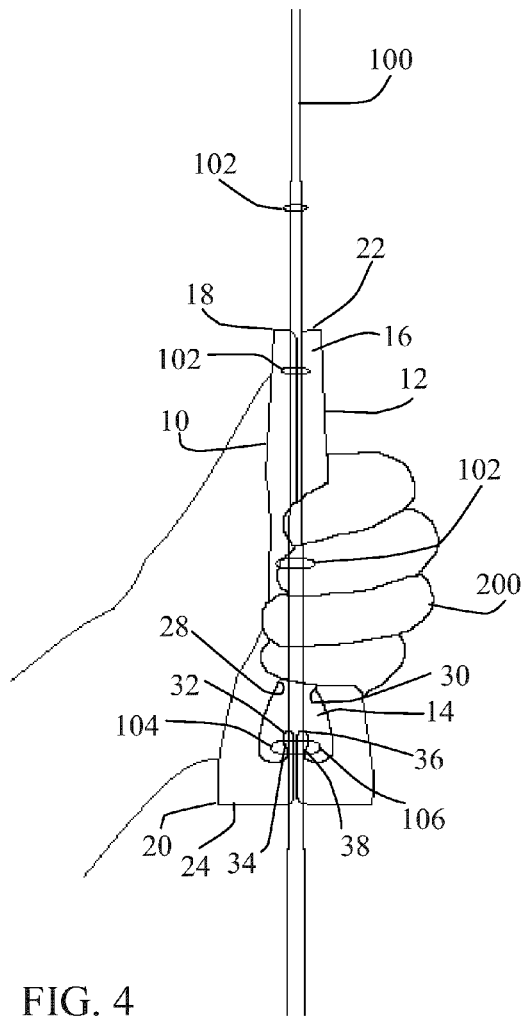
FIG. 4 is a front elevation view of the third step of attaching the fishing hook and lure protector to a fishing rod.
Figure 5:
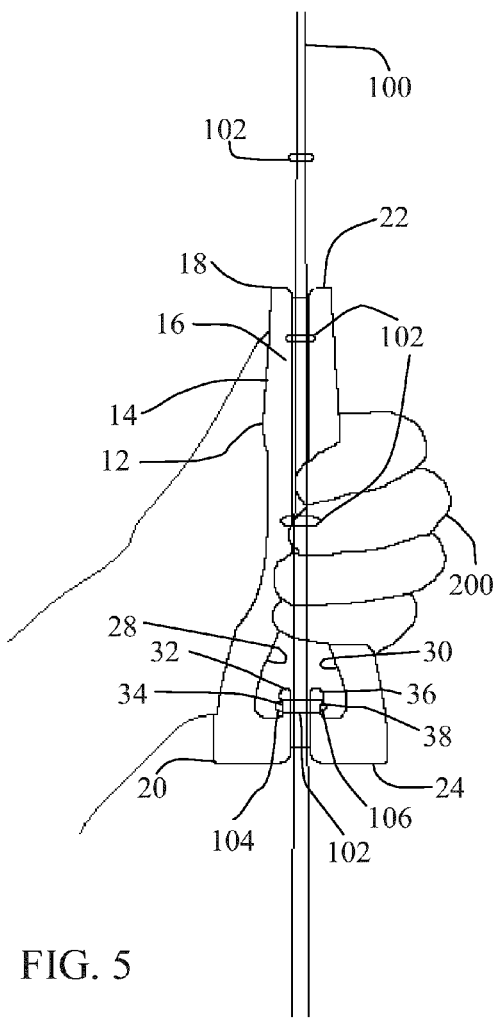
FIG. 5 is a front elevation view of the fishing hook and lure protector on a fishing rod.

Referring to FIG. 5, a first engagement profile 32 along first engagement edge 28 has a recess 34 configured to receive a ring shaped line guide 102 of a fishing rod 100 and is configured to engage a first inside edge 104 of line guide 102 of fishing rod 100. A second engagement profile 36 along second engagement edge 30 has a recess 38 configured to receive ring shaped line guide 102 of fishing rod 100 and is configured to engage a second inside edge 106 of the same line guide 102 of fishing rod 100 engaged by first engagement profile 32. Referring to FIG. 3 and FIG. 4, overlapping of first engagement edge 28 and second engagement edge 30 closes slit 26 of enclosure 14 and maintains first engagement profile 32 and second engagement profile 36 biased by resilient sidewall 16 into engagement with line guide 102 of fishing rod 100.

Figure 6:
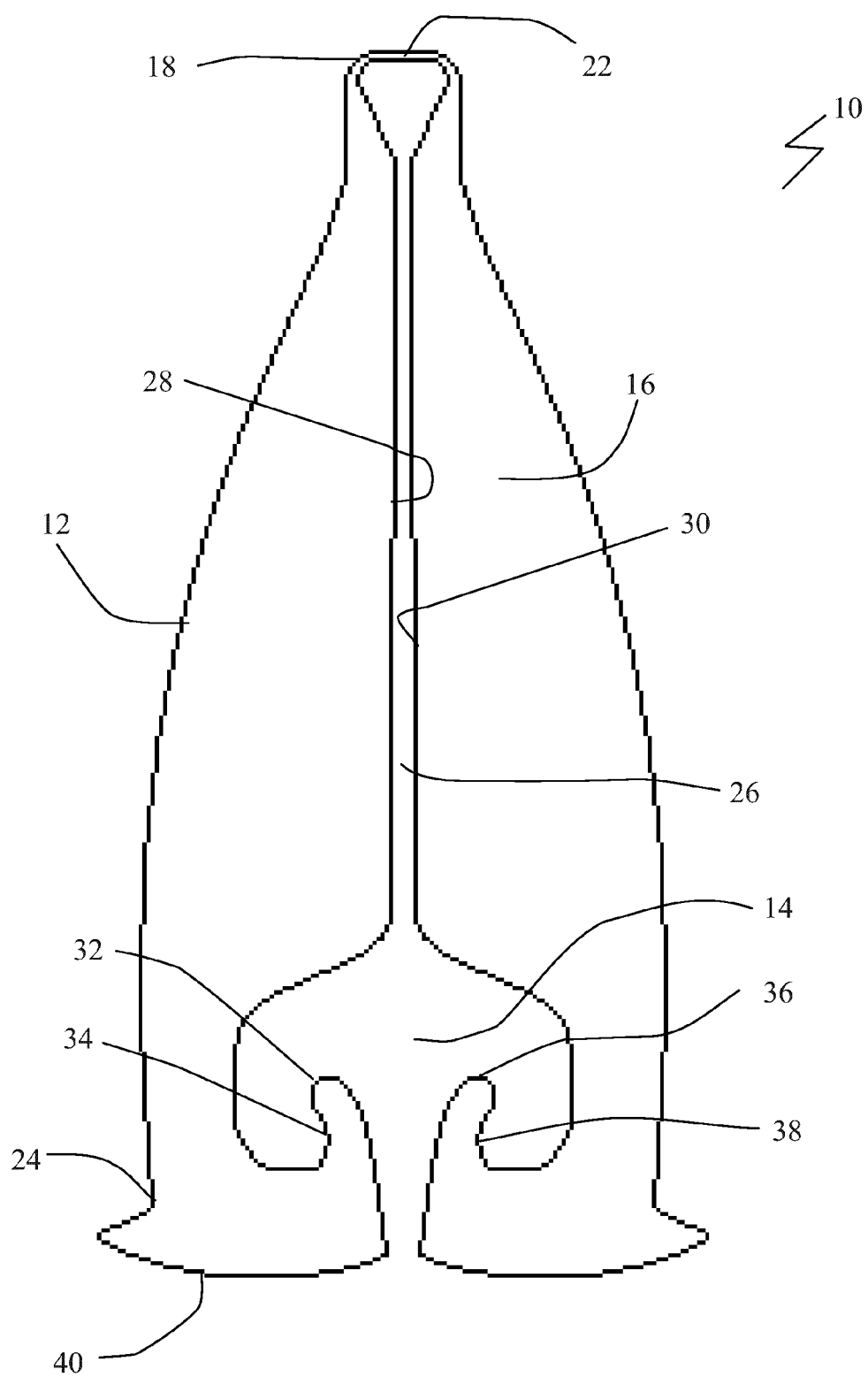
FIG. 6 is a front elevation view of a fishing hook and lure protector with a skirt.

Referring to FIG. 6, fishing hook and lure protector 10 has a skirt 40 at second access opening 24. Skirt 40 flares outwards from second access opening 24 and has a diameter larger than the diameter of second access opening 24. Skirt 40 helps to guide a hook or lure into hollow body 12 and helps to maintain the shape and flex strength of fishing hook and lure protector.

Figure 2:
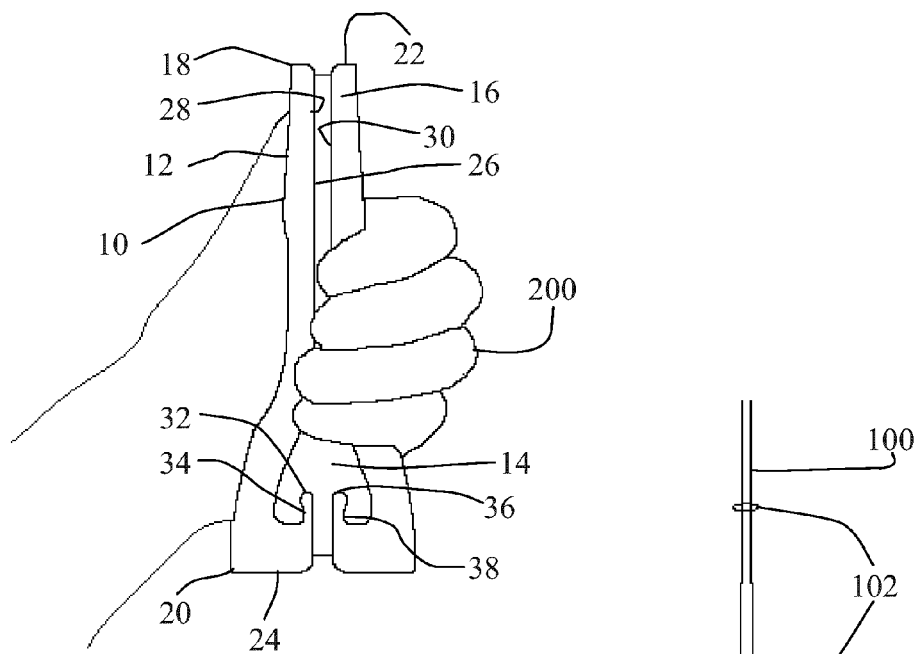
FIG. 2 is a front elevation view of the first step of attaching the fishing hook and lure protector to a fishing rod.

Operation:

Referring to FIG. 2, fishing hook and lure protector 10 is held in the hand 200 of a user with slit 26 facing away from the user's palm. First engagement edge 28 and second engagement edge 30 are separated from each other. A fishing line, not shown, is slid through slit 26 and passes through first access opening 22 and second access opening 24. Referring to FIG. 3, body 12 is squeezed in the user's hand 200 which causes slit 26 to close as first engagement edge 28 and second engagement edge 30 to overlap each other. Referring to FIG. 4, first engagement profile 32 and second engagement profile 36 are also moved into contact with each other to allow them to slip inside line guide 102. Referring to FIG. 5, once first engagement profile 32 and second engagement profile 36 are slipped inside line guide 102, the user releases the pressure causing first engagement profile 32 and second engagement profile 36 to spring away from each other and make contact with first inside edge 104 and second inside edge 106 of line guide 102, respectively. First engagement edge 28 and second engagement edge 30 remain in overlapping contact with each other to prevent the fishing line from slipping out of protector 10. Recess 34 of first engagement profile 32 contacts first inside edge 104 of line guide 102 and recess 38 of second engagement profile 36 contacts second inside edge 106 of line guide 102 to hold protector 10 in place on fishing rod 100.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A fishing hook and lure protector, comprising:
   a hollow body that defines an enclosure, the body having
      a resilient sidewall with a first circumferential peripheral edge, a second circumferential peripheral edge and a slit that extends for a height of the resilient sidewall from the first circumferential peripheral edge to the second circumferential peripheral edge and defines a first engagement edge and a second engagement edge;
   a first engagement profile along the first engagement edge, the first engagement profile including a recess configured to receive a ring shaped line guide of a fishing rod and to engage a first inside edge of the line guide of the fishing rod;
   a second engagement profile along the second engagement edge, the second engagement profile including a recess configured to receive the ring shaped line guide of the fishing rod and to engage a second inside edge of the same line guide of the fishing rod engaged by the first engagement profile;
   each recess of the first and second engagement profiles comprises a first portion that is open to the slit and extends away from the slit, and a second portion that is spaced from the slit and extends in the direction of the height of the resilient sidewall, whereby overlapping of the first engagement edge and the second engagement edge closes the slit of the enclosure and maintains the first engagement profile and the second engagement profile biased by the resilient sidewall into engagement with the line guide of the fishing rod.

2. The fishing hook and lure protector of claim 1, wherein the first circumferential peripheral edge has a circumference that defines a first access opening to the enclosure that is too small for a hook or lure to pass through and the second circumferential peripheral edge has a circumference the defines a second access opening that is large enough for the hook or lure to enter and exit the enclosure.

3. The fishing hook and lure protector of claim 2, wherein the body is the shape of a funnel.

4. The fishing hook and lure protector of claim 2 further comprising a skirt flaring outwards from the second access opening.

* * * * *